No. 845,874. PATENTED MAR. 5, 1907.
G. E. KELLY & G. F. ROYER.
COUPLING APPARATUS FOR FLUID PRESSURE BRAKE MECHANISMS.
APPLICATION FILED MAY 1, 1906.
3 SHEETS—SHEET 1.
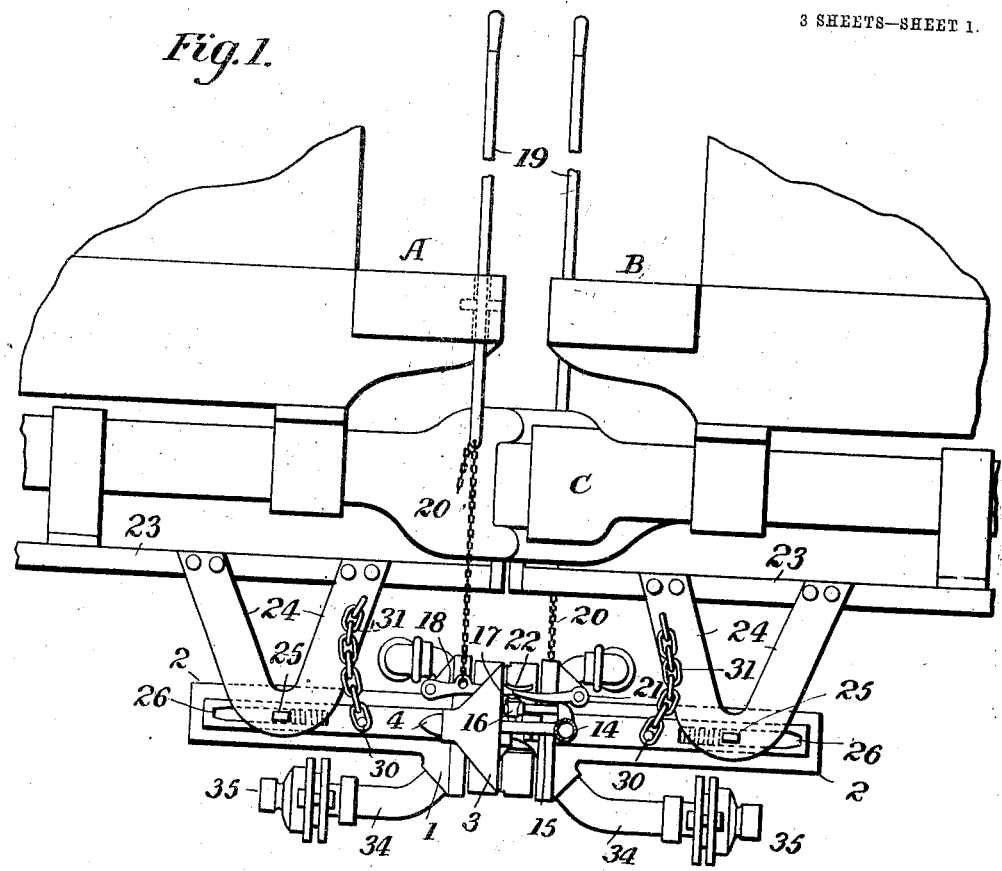
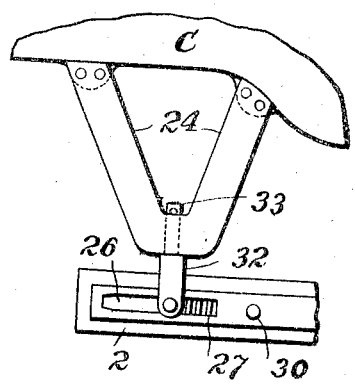
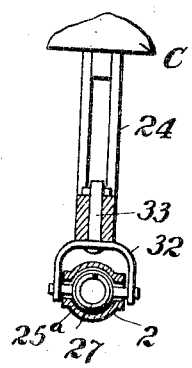

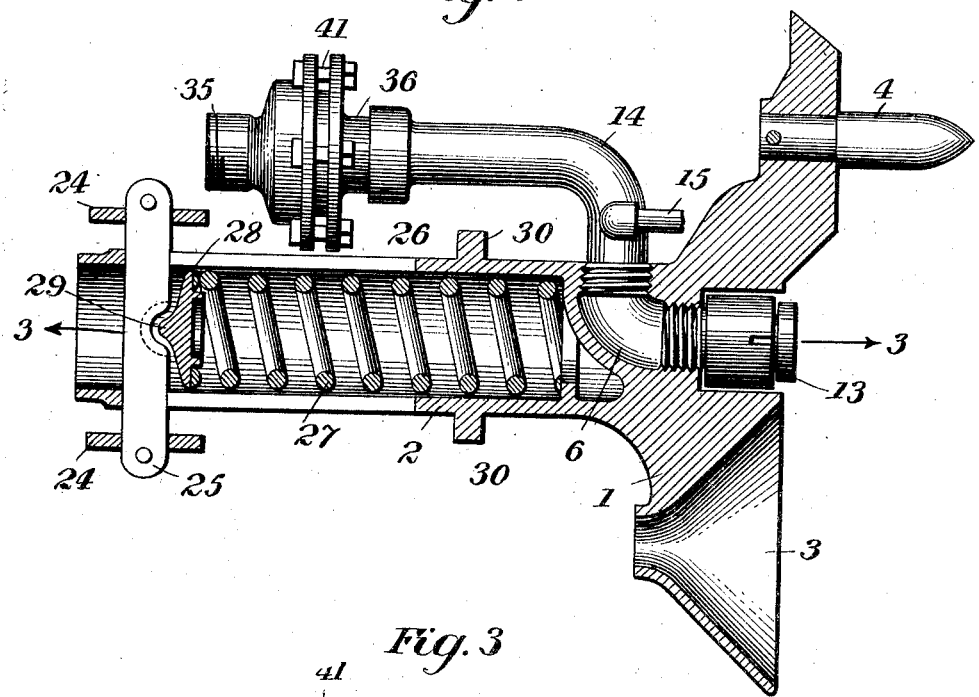
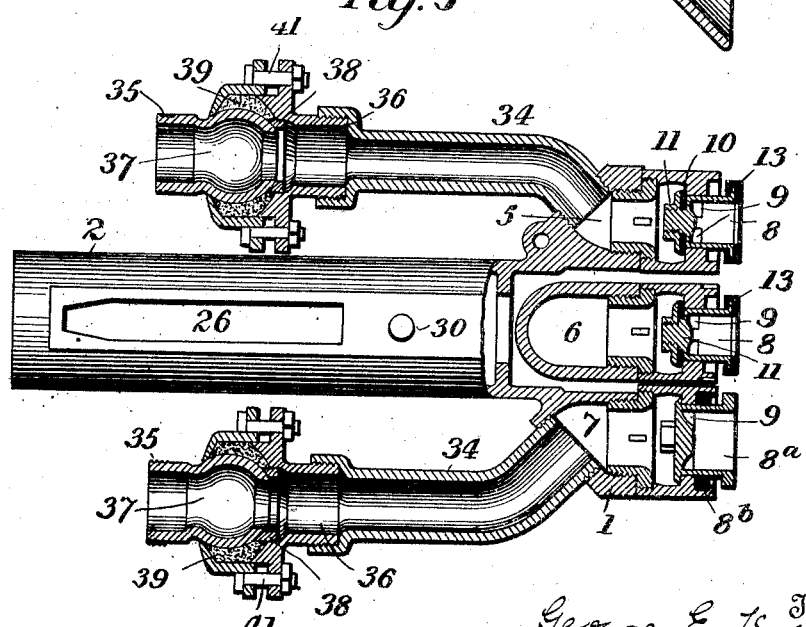

No. 845,874. PATENTED MAR. 5, 1907.
G. E. KELLY & G. F. ROYER.
COUPLING APPARATUS FOR FLUID PRESSURE BRAKE MECHANISMS.
APPLICATION FILED MAY 1, 1906.

3 SHEETS—SHEET 3.

Witnesses
by George E. Kelly
George F. Royer
Inventor

Attorneys

UNITED STATES PATENT OFFICE.

GEORGE E. KELLY AND GEORGE F. ROYER, OF WILKES-BARRE, PENNSYLVANIA, ASSIGNORS, BY DIRECT AND MESNE ASSIGNMENTS, TO THE KELLY-ARNOLD MANUFACTURING COMPANY, OF WILKES-BARRE, PENNSYLVANIA, A CORPORATION OF PENNSYLVANIA.

COUPLING APPARATUS FOR FLUID-PRESSURE BRAKE MECHANISMS.

No. 845,874.     Specification of Letters Patent.     Patented March 5, 1907.

Application filed May 1, 1906. Serial No. 314,705.

*To all whom it may concern:*

Be it known that we, GEORGE E. KELLY and GEORGE F. ROYER, citizens of the United States, and residing at Wilkes-Barre, Luzerne county, State of Pennsylvania, have invented certain new and useful Improvements in Coupling Apparatus for Fluid-Pressure Brake Mechanism, of which the following is a specification.

The present invention relates to improvements in automatic couplers for fluid-pressure brake apparatus for railway-cars of the general character of that described and claimed in Letters Patent No. 811,068, issued on January 30, 1906.

The object of the present invention is to provide a construction which will be more simple and compact than that illustrated in said patent, whereby the cost of manufacturing the article will be reduced without sacrificing any of the advantages thereof.

The present invention is illustrated in the accompanying drawing, in which—

Figure 4:
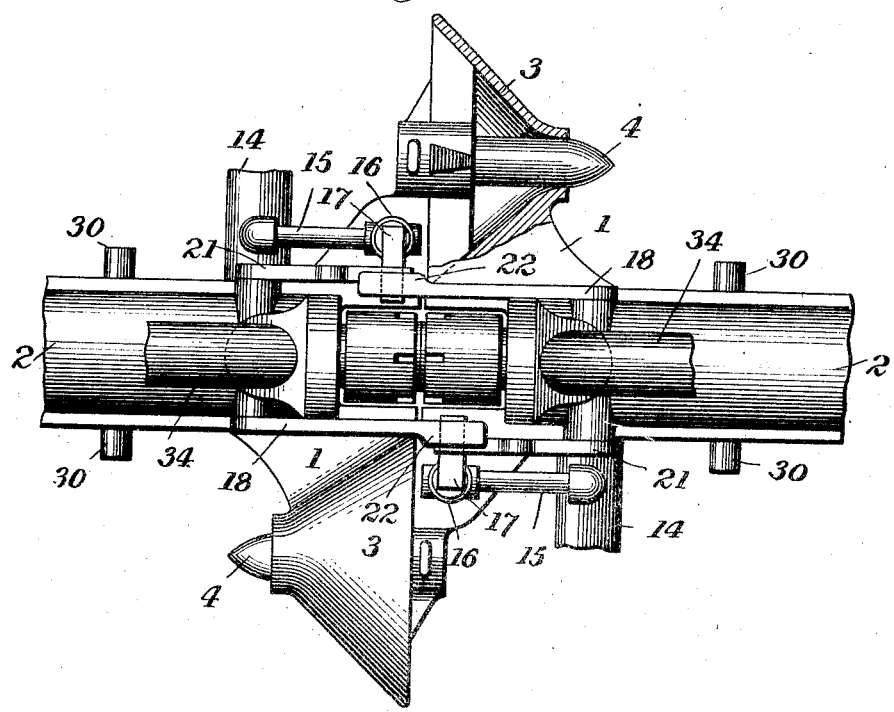
Figure 5:
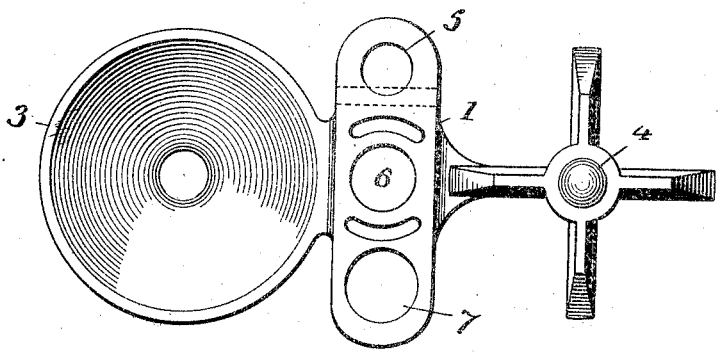

Figure 1 is a side view of the ends of two cars having the improved brake-coupler attached thereto. Fig. 2 is a horizontal sectional view through one of the sections of the coupler, on an enlarged scale. Fig. 3 is a vertical sectional view through the same section of coupler on the line 3 3 of Fig. 2. Fig. 4 is a plan view of the coupler, partly in section. Fig. 5 is a face view of one of the coupler-sections. Fig. 6 illustrates a slightly-different way of supporting the coupler-sections from the cars. Fig. 7 is a sectional view of the parts shown in Fig. 6. Fig. 8 is a detail view.

Referring to the drawings, A B designate the platforms of two railway-cars, which are represented as coupled together by a draft-coupling C. As these parts may be of any common construction, they are merely illustrated conventionally in the drawing.

To the draw-head of each section of the draft-coupler is secured one section of the improved coupling forming the subject of this invention, each of said sections comprising a head 1 and a stem 2. The heads 1 are of such form that when brought together they are adapted to closely engage one with the other in order that the several ducts or passages therein may be in proper communication one with the other. As shown, each of said heads is provided at one side with a guide or passage 3 and at the opposite side with a projecting guide-pin 4, which when the sections come together is adapted to enter the guide 3 on the opposite head and properly aline the several ports or ducts in the coupler.

Each coupler-head is provided with three ducts 5, 6, and 7, the intermediate one of which is connected with and adapted to form part of the train-brake pipe. The duct 5 at the upper side of the coupler forms a part of the whistle-operating conduit, while the lower duct 7 is for the steam-pipe used for heating or other purposes. Each of said ducts is provided with a suitable valve, which when the coupling-heads are separated is held in the position shown in Fig. 3 by the pressure of fluid on their rear or inner faces. When the two heads 1 of the coupler are interlocked, however, the valves of one head contact with the corresponding valves on the other, and all of them are forced inward, so as to open the ports therein, whereby a continuous fluid-passage is provided from the ducts connected with one car to the corresponding ducts on the other.

As shown, the valves 8 of the brake and whistle conduits each consist of a cylindrical body open at its outer end and having in its side wall near the opposite end thereof a series of ports 9. A gasket 10 is arranged against the inner head or end of said body and projects laterally some distance beyond the same, said gasket being held in place by a suitable nut 11, screwed on a stem projecting from the end of the valve-body. At the outer end the valve is provided with a gasket 13, adapted to fit closely against a seat in its guide and supporting-piece when the valve is opened. When the valve is closed, as shown in Fig. 3, the outer gasket 13 thereof projects beyond the face of the body of the coupler-head and the inner gasket 10 is in close contact with the wall of the coupler, so that the escape of fluid from the conduits is positively prevented.

The valve 8ª of the steam-duct 7 consists of a cylindrical body, similar to that of the valves 8 of the air-conduits 5 and 6, having similar ports near its inner end. At its inner end, however, it is provided with a metal flange having a beveled face adapted to be seated in a correspondingly-formed seat, and a gasket or packing-ring 8ᵇ is fitted in a recess in the valve-casing and bears close against the body of the valve.

With each of the ducts 6 is connected an elbow 14, which is connected to a coupling, hereinafter described, with the air-brake pipe on the car, and from each of said elbows extends a branch 15, which is open at its free end adjacent the face of the coupler-head. As shown, this branch duct is suitably attached to the side of the coupler-head 1, and in it is arranged a rotary valve 16, having at its upper end a laterally-projecting arm 17, by means of which the valve may be rotated to open communication between the duct 6 and the atmosphere or to close the branch or outlet pipe 15.

Normally the valves 16 are in their closed position where the ducts 6 are cut off from communication with the atmosphere and means are provided whereby on the accidental separation of the coupler-heads 1 said valves will be rotated to open the pipes in which they are arranged, and thereby allow the pressure in the ducts 6 to be reduced and the brakes controlled thereby to come into action and check the movement of the cars.

In the embodiment of the invention illustrated each of the coupler-heads is provided with a swinging hook 18, the free end of each of which is adapted to engage with the arm 17 of the valve 16 on the other coupler-head when said heads are in contact. It will be seen that when the coupler-heads are separated, the hooks 18 being in engagement with the valve-arms 17, that both of said valves will be turned and the ducts 6 in both coupler-heads brought into communication with the atmosphere, and thus cause a setting of the brakes, as above described. In order that such a setting of the brakes may be prevented when the cars are intentionally uncoupled, means are provided by which the hooks 18 are raised from engagement with the valve-arms 17 whenever the draft-coupler C is opened by the operation of either of the uncoupling-levers 19 on the cars. As shown, a short chain or cable 20 connects each of the hooks 18 with an uncoupling-lever 19.

Each hook 18 is secured to one end of a rock-shaft suitably journaled in the coupler-head, and to the opposite end of said shaft is secured a trip-arm 21, the free end of which extends beneath a flange or lip 22 on the hook 18 of the other coupler-section when the heads are in contact. Therefore when either hook 18 is disengaged from its valve-arm 17 the trip-arm 21 thereof will be simultaneously rocked and cause the hook 18 on the other coupler-section to be moved from engagement with its valve-arm 17. Therefore both hooks 18 will be moved to inoperative position when either coupling-lever 19 is operated.

The coupler may be supported in various ways. As shown in Figs. 1 to 3, each section thereof is supported by a plate 23, secured to the draw-head of the draft-coupling C. This plate is provided at its sides with depending ribs or flanges, to which are secured hangers 24, the lower ends of which are connected by a plate or cross-bar 25, that extends through slots 26, formed in the stem 2 of the coupler-section. This stem is hollow, and within it is arranged a suitable coiled spring 27, one end of which abuts against the inner face of the head of the coupler-section, while the other end bears on a plate 28, having a projection 29, extending into a recess or groove in one edge of the bar 25. The stem 2 is also provided with laterally-projecting studs 30, which are connected by suitable chains 31 with the plate 23. When the coupler-heads are in working position, the springs 27 are compressed, as shown in Fig. 1, and the force exerted by said springs is sufficient to maintain the heads in proper relation without requiring the use of any special fastening or locking means between them.

A modified form of supporting the coupler-sections is illustrated in Figs. 6 and 7. In this embodiment of the invention the cross bar or plate 25ᵃ is supported at the lower ends of a yoke 32, which yoke is connected by a swivel 33 with the draw-head of the draft-coupling or a part supported thereby or by the frame of the car. The ducts 5 7 of each coupler-section are connected by suitable elbows 34 with suitable pipes by couplings similar to that at the end of the elbow 14, leading from the brake-duct 6. Said coupling consists of two main members, each having a threaded end 35 36 for attachment to a pipe and being connected together by a universal joint. As shown, the member 35 of said coupling is expanded into a ball-like portion 37, which is adapted to rest against a lead or other soft-metal seat 38 in the other member of the coupling. A metal packing 39 surrounds said ball portion 37, being held in place by a clamping-ring 40, which is secured in position by screws 41. This construction provides a secure and tight universal joint all the parts of which may be made of metal. The clamping-ring 40 surrounds a rib on the member of the coupling connected with the elbow 34 and is provided with an opening of practically the same diameter as the portion of the ball-like member 37 that extends through it.

It will be noticed that the present invention provides a simple and effective coupling for fluid-pressure brake devices and avoids entirely the use of rubber hose or other flexible conduits— that is, by the present invention it is possible to provide a fluid-pressure brake mechanism which shall consist of metal throughout and yet have all the flexibility required.

Having fully described the invention, what is claimed is—

1. The combination with two railway-cars provided with fluid-pressure brake devices, and a draft-coupling connecting the cars, of a brake-pipe coupling comprising a section connected with each car and having therein a passage forming part of the brake system, a rotary valve adapted to open said passage to the atmosphere, means on each brake-coupler section for actuating the rotary valve of the other section when the cars are accidentally separated, and means for rendering the aforesaid means inoperative when the draft-coupling is intentionally opened.

2. The combination with two railway-cars provided with fluid-pressure brake devices, and a draft-coupling connecting the cars, of a brake-coupling comprising a section connected with each car and having therein a passage forming part of the brake system, a rotary valve adapted to open said passage to the atmosphere, an arm pivotally mounted on each section and adapted to actuate the rotary valve of the other section to open said passage to the atmosphere when the cars are accidentally separated, and means for rocking said arms to inoperative position when the draft-coupling is intentionally opened.

3. The herein-described fluid-pressure brake-pipe coupling, consisting of two similar sections each comprising a head having therein a passage adapted to form part of the brake-fluid conduit, a valve adapted to open said passage to the atmosphere, and a pivotally-mounted device adapted to engage the operating device of the aforesaid valve of the other coupler-section.

4. The herein-described fluid-pressure brake-pipe coupling consisting of two similar sections each comprising a head having therein a passage adapted to form part of the brake-fluid conduit, a rotary valve mounted in a duct extending from said passage to the atmosphere and provided with a laterally-projecting arm, and means adapted to engage said arm on the aforesaid valve of the other coupler-section.

5. The combination with a railway-car, of a fluid-pressure brake-coupling section consisting of a head having suitable passages formed therein and a tubular stem connected with said head at one end, a coiled spring arranged within said stem, and a bar or plate supported from the car and extending through slots in the sides of said stem, and across the end of the spring therein.

6. The combination with a railway-car, of a fluid-pressure brake-coupling section consisting of a head having suitable passages formed therein and a stem connected with said head at one end, a yoke having a swivel connection with the car and having its arm connected to said stem to permit the latter to move longitudinally, and a coiled spring arranged between the head of the coupler-section and a bar or plate connected with the lower ends of the yoke-arms.

7. The combination with a railway-car, of a fluid-pressure brake-coupling section consisting of a head having suitable passages formed therein and a tubular stem connected with said head at one end, a yoke having a swivel connection with the car and having its arms connected to said stem to permit the latter to move longitudinally, and a coiled spring arranged within said stem and bearing against the head of the coupler-section and a bar or plate connecting the arms of the yoke.

8. The herein-described coupling for fluid-pressure brake apparatus comprising two similar sections each having therein a passage adapted to form part of the train-pipe and provided with a lateral outlet, a valve arranged to close said outlet, a rock-shaft mounted on each section of the coupler, an arm extending from each shaft and adapted to actuate the aforesaid valve of the other coupler-section, a trip-arm carried by said shaft and adapted to engage the valve-actuating arm of the other coupler-section, and means for rocking either of said shafts.

9. The herein-described coupling for fluid-pressure brake apparatus comprising two similar sections each having therein a passage adapted to form part of the train-pipe and provided with a lateral outlet, a valve arranged in a passage or duct connecting said outlet with the atmosphere and provided with a lateral-projecting arm, a hook pivotally mounted on each coupler-section and adapted to engage the arm of said valve on the other section, a pivotally-mounted trip carried by each section and adapted to engage said hook on the other section, and means whereby when either hook is moved out of engagement with the valve controlled thereby, the trip-arm on the same coupler-section as said hook will disengage the hook of the other section from its valve, substantially as described.

In testimony whereof we affix our signatures in presence of two witnesses.

GEORGE E. KELLY.
GEORGE F. ROYER.

Witnesses:
JOHN J. O'DONNELL,
MICHAEL J. McGINLEY.